(12) United States Patent
Liu et al.

(10) Patent No.: US 11,489,449 B2
(45) Date of Patent: Nov. 1, 2022

(54) ADJUSTABLE LEAKAGE INDUCTANCE TRANSFORMER

(71) Applicant: National Taiwan University of Science and Technology, Taipei (TW)

(72) Inventors: Yu-Chen Liu, Taipei (TW); Chen Chen, New Taipei (TW); Kai-De Chen, Tainan (TW); Yong-Long Syu, Tainan (TW); Anh Dung Nguyen, Blacksburg, VA (US); Huang-Jen Chiu, New Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 580 days.

(21) Appl. No.: 16/576,333

(22) Filed: Sep. 19, 2019

(65) Prior Publication Data

US 2020/0211755 A1 Jul. 2, 2020

(30) Foreign Application Priority Data

Dec. 26, 2018 (TW) ................................ 107147105

(51) Int. Cl.

| | |
|---|---|
| *H02M 3/335* | (2006.01) |
| *H01F 21/02* | (2006.01) |
| *H01F 27/24* | (2006.01) |
| *H01F 27/28* | (2006.01) |
| *H02M 3/00* | (2006.01) |

(52) U.S. Cl.
CPC ........ *H02M 3/33584* (2013.01); *H01F 21/02* (2013.01); *H01F 27/24* (2013.01); *H01F 27/2823* (2013.01); *H02M 3/33573* (2021.05); *H02M 3/33592* (2013.01); *H02M 3/003* (2021.05); *H02M 3/01* (2021.05)

(58) Field of Classification Search
CPC ...... H01F 21/02; H01F 27/24; H01F 27/2823; H02M 3/33584; H02M 3/33592
See application file for complete search history.

(56) References Cited

U.S. PATENT DOCUMENTS

| | | | |
|---|---|---|---|
| 2006/0038649 A1* | 2/2006 | Mehrotra | ............ H01F 27/2804 336/83 |
| 2008/0048818 A1* | 2/2008 | Mao | ........................ H01F 27/34 336/213 |
| 2019/0019610 A1* | 1/2019 | Lu | ......................... H02M 7/043 |

\* cited by examiner

*Primary Examiner* — Rafael O De Leon Domenech
(74) *Attorney, Agent, or Firm* — Li & Cai Intellectual Property (USA) Office

(57) ABSTRACT

An adjustable leakage inductance transformer includes a magnetic core, a primary side coil and a secondary side coil. The magnetic core includes a magnetic core column structure, which has a central column, a first outer column and a second outer column. The primary side coil is wound on the first outer column and the second outer column by a first primary side coil loop number and a second primary side coil loop number, respectively. The secondary side coil is wound on the first outer column and the second outer column by a first secondary side coil loop number and a second secondary side coil loop number, respectively, the first primary side coil loop number is not equal to the first secondary side coil loop number, and the second primary side coil loop number is not equal to the second secondary side coil loop number.

9 Claims, 10 Drawing Sheets

ADJUSTABLE LEAKAGE INDUCTANCE TRANSFORMER

CROSS-REFERENCE TO RELATED PATENT APPLICATION

This application claims the benefit of priority to Taiwan Patent Application No. 107147105, filed on Dec. 26, 2018. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a transformer, and more particularly to an adjustable leakage inductance transformer.

BACKGROUND OF THE DISCLOSURE

In order to more effectively improve a performance of home energy storage systems, improving conversion efficiency and power density is an important goal of bidirectional DC-DC converters. A circuit architecture commonly used for high performance bidirectional isolated DC-DC converters is a CLLC resonant converter. For the CLLC circuit, characteristics thereof are similar to those of an LLC circuit, and resonant tank parameters can be designed to achieve full load range soft switching, thereby achieving high efficiency and high power density.

However, since the LLC circuit has an asymmetric resonant tank, a voltage gain thereof is unable to be adjusted for bidirectional applications in a reverse mode. Therefore, additional secondary side resonant inductors are required to achieve a CLLC symmetrical resonant tank design, however, loss of the overall circuit may be increased. In addition, in a case of high frequency switching, even if a secondary side resonant inductance is increased, since peaks of two gain curves are encountered when an operating frequency moves from a first resonance point to a second resonance point, causing an issue that the voltage gain of the CLLC circuit is unable to be adjusted, the CLLC circuit cannot provide a wide output voltage range when a battery is charged and discharged.

In order to achieve a wide output voltage range and solve the issues that the operating frequency is too large when the circuit is operated at high frequencies, a two-stage circuit will be used to overcome the above issues. The CLLC circuit as a former stage of the two-stage circuit is mainly used for electrical isolation. An operating frequency of the CLLC circuit is fixed at a resonant frequency to achieve the highest conversion efficiency, while the output voltage is adjusted by the second stage circuit of the two-stage circuit. Further, in order to improve the conversion efficiency of the CLLC circuit, on-time and off-time of synchronous rectification switches can be optimized. However, the above method is not a fundamental solution to the overall circuit loss.

In addition, in order to complete a design of a bidirectional resonant tank, the architecture of the CLLC circuit requires three magnetic components, which are a resonant inductor, a transformer, and a secondary side resonant inductor. Since an excessive number of magnetic components increase overall circuit loss, even if the magnetic components are optimized to reduce loss, the excessive number of magnetic components makes it difficult to achieve high power density goals.

Therefore, achieving a two-way resonant tank design through an improvement of the transformer design to accomplish a low-loss, high-efficiency integrated transformer, while overcoming the above-mentioned shortcomings, has become one of the important issues in the related art.

SUMMARY OF THE DISCLOSURE

In response to the above-referenced technical inadequacies, the present disclosure provides an adjustable leakage inductance transformer.

In one aspect, the present disclosure provides an adjustable leakage inductance transformer including a magnetic core, a primary side coil and a secondary side coil. The magnetic core includes an upper cover, a lower cover and a magnetic core column structure. The lower cover is disposed opposite to the upper cover, and the magnetic core column structure is disposed between the upper cover and the lower cover and has a central column, and a first outer column and a second outer column disposed on two sides of the central column. The central column has a first concave surface facing the first outer column and a second concave surface facing the second outer column, and the first outer column and the second outer column have cylindrical structures. The primary side coil is wound on the first outer column and the second outer column by a first primary side coil loop number and a second primary side coil loop number, respectively. The secondary side coil is wound on the first outer column and the second outer column by a first secondary side coil loop number and a second secondary side coil loop number, respectively. The first primary side coil loop number is not equal to the first secondary side coil loop number, and the second primary side coil loop number is not equal to the second secondary side coil loop number. When a primary side cross voltage is applied to the primary side coil or a secondary side cross voltage is applied to the secondary side coil, the primary side coil has a primary side leakage inductance, the secondary side coil has a secondary side leakage inductance, and the primary side leakage inductance and the secondary side leakage inductance are positively correlated with a cross-sectional area of the central column.

Therefore, the adjustable leakage inductance transformer provided by the present disclosure can integrate a primary side resonant inductor, a transformer and a secondary side resonant inductor of the CLLC circuit into one magnetic element, and utilize a magnetic circuit to separate magnetic flux to increase a leakage inductance. Therefore, in addition to meeting the bidirectional resonant tank design, an improved transformer design can achieve a low loss, high efficiency integrated transformer.

Furthermore, the primary side coil and the secondary side coil are wound on the first outer column and the second outer column in an asymmetrical manner, respectively, such that a magnetic circuit of the central column can be utilized to separate the magnetic flux to further generate leakage magnetic flux. A ratio of the effective cross-sectional area of the central column to the first outer column and the second outer column can be changed to adjust the leakage inductance.

Moreover, an actual size of the magnetic core can be optimized by taking iron loss of the magnetic core, copper loss of the primary side coil and the secondary side coil, and a total volume into account. If an influence of the skin effect and the proximity effect on a total AC resistance is taken into consideration, thicknesses of windings of the primary side coil and the secondary side coil can be optimized.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
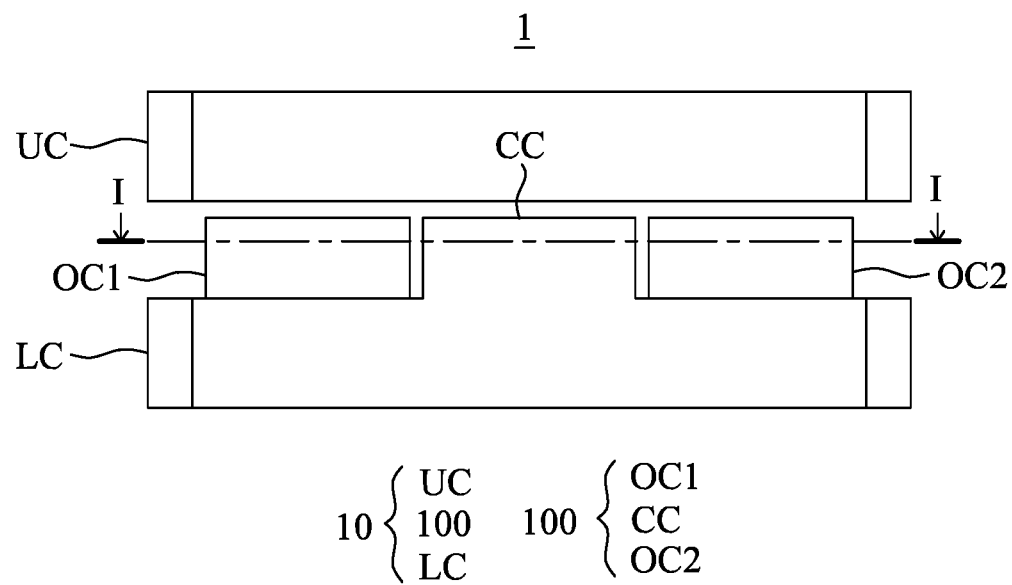
FIG. 1 is a side schematic view of an adjustable leakage inductance transformer in accordance with an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

In order to reduce an alternating current (AC) winding loss at high frequencies, peak magnetomotive forces are reduced by an interleaved winding structure. However, this method decreases a leakage inductance of the transformer to nH level, which is extremely small, which is a disadvantage for a CLLC architecture that requires a certain amount of leakage inductance to design a resonant tank. Therefore, the present disclosure uses a concept of an adjustable leakage inductance, which can be achieved by using a three-column transformer structure.

In detail, the concept is that a primary side coil and a secondary side coil are wound on outer columns in an asymmetrical manner, such that a magnetic circuit of the central column can be utilized to separate the magnetic flux to further generate leakage magnetic flux, and a ratio of the effective cross-sectional area of the central column to the outer columns can be changed to adjust the leakage inductance.

Figure 2:
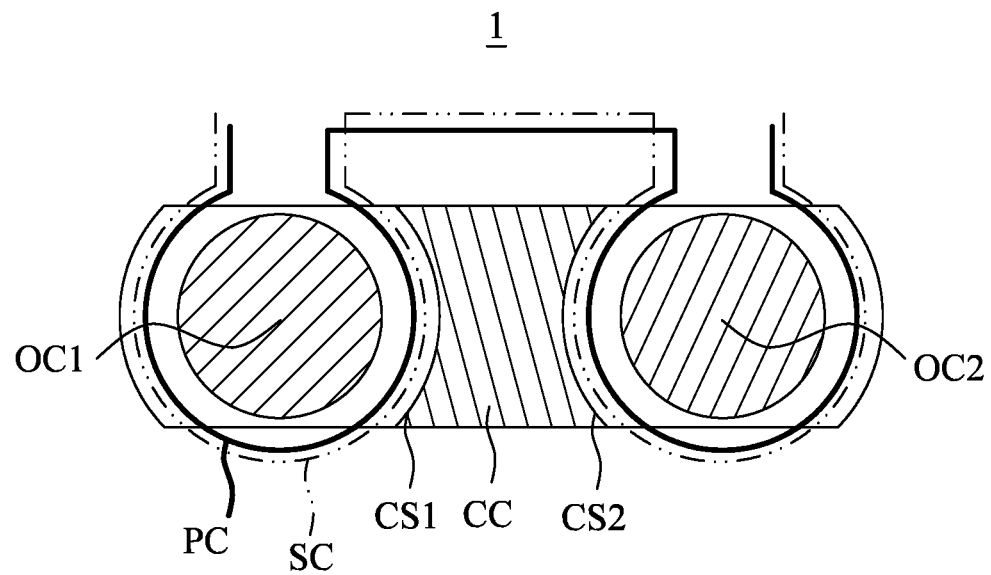
FIG. 2 is a schematic cross-sectional view taken along line I-I of FIG. 1.
Figure 3:
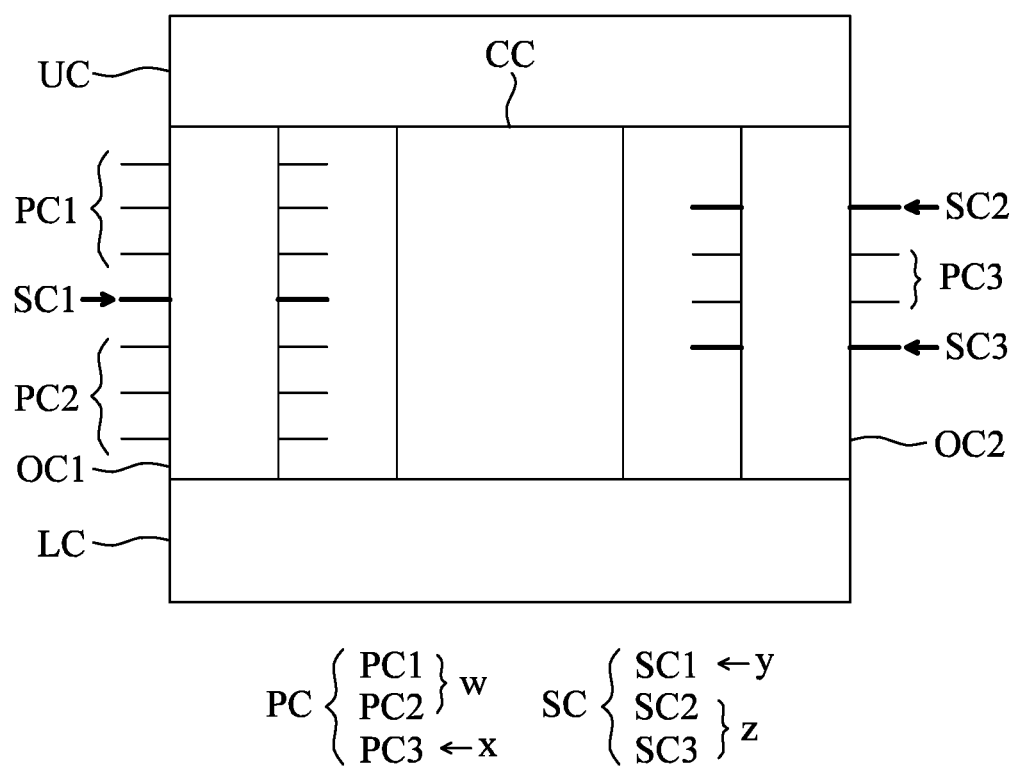
FIG. 3 is a schematic view showing a primary side coil and a secondary side coil of the adjustable leakage inductance transformer wound in a partially interleaved manner according to an embodiment of the present disclosure.

The concept of the adjustable leakage inductance can be seen in FIG. 1 to FIG. 3. FIG. 1 is a side schematic view of an adjustable leakage inductance transformer in accordance with an embodiment of the present disclosure, FIG. 2 is a schematic cross-sectional view taken along line I-I of FIG. 1, and FIG. 3 is a schematic view showing a primary side coil and a secondary side coil of the adjustable leakage inductance transformer wound in a partially interleaved manner according to an embodiment of the present disclosure.

An embodiment of the present disclosure provides an adjustable leakage inductance transformer 1 including a magnetic core 10, a primary side coil PC, and a secondary side coil SC. The magnetic core 10 includes an upper cover UC, a lower cover LC, and a magnetic core column structure 100. The lower cover LC is disposed opposite to the upper cover UC, and the magnetic core column structure 100 is disposed between the upper cover UC and the lower cover LC and has a central column CC, and a first outer column OC1 and a second outer column OC2 disposed on two sides of the central column. The central column CC has a first concave surface CS1 facing the first outer column OC1 and a second concave surface CS2 facing the second outer column OC2, and the first outer column OC1 and the second outer column OC2 have cylindrical structures.

The primary side coil PC is wound around the first outer column OC1 and the second outer column OC2 by a first primary side coil loop number w and a second primary side coil loop number x, respectively. The secondary side coil SC is wound around the first outer column OC1 and the second outer column OC2 by a first secondary side coil loop number y and a second secondary side coil loop number z, respectively.

In the present embodiment, the primary side coil PC and the secondary side coil SC are wound around the first outer column OC1 and the second outer column OC2 in a partially interleaved manner. The concept is that the primary side coil PC and the secondary side coil SC are wound in an asymmetrical form on the first outer column OC1 and the second outer column OC2, respectively. A magnetic circuit of the central column CC can be utilized to provide a path for the magnetic flux to further generate leakage magnetic flux, and ratios of effective cross-sectional areas of the central column CC to the first outer column OC1 and the second outer column OC2 can be changed to adjust the leakage inductance.

As shown in FIG. 3, a first part PC1 of the primary side coil PC, a first part SC1 of the secondary side coil SC1, and a second part PC2 of the primary side coil PC are sequentially wound on the first outer column OC1, and a second part SC2 of the secondary side coil SC, a third part PC3 of the primary side coil PC, and a third part SC3 of the secondary side coil SC are sequentially wound on the second outer column OC2.

Figure 4:
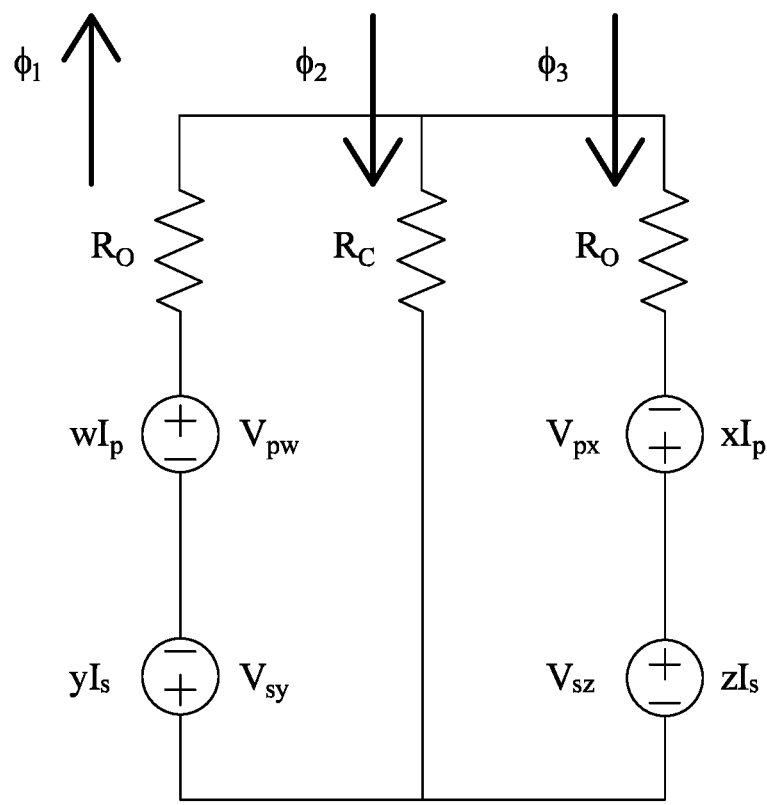
FIGS. 4 and 5 are schematic diagrams showing magnetic circuit layouts of the adjustable leakage inductance transformer according to an embodiment of the present disclosure.
Figure 5:
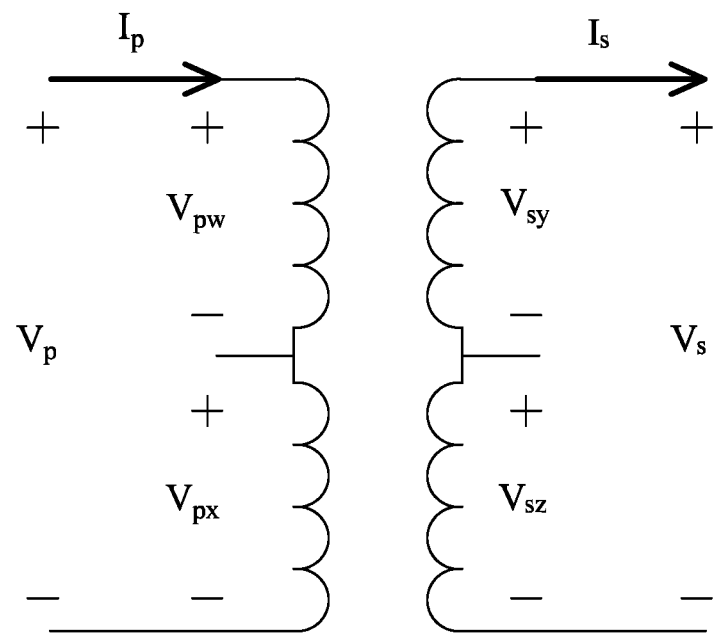

Reference is made to FIGS. 4 and 5, which are schematic diagrams showing magnetic circuit layouts of the adjustable leakage inductance transformer according to an embodiment of the present disclosure.

The concept of the adjustable leakage inductance can be further represented by FIGS. 4 and 5. A primary side cross voltage of the transformer is $V_p$, and a secondary side cross voltage is $V_s$. The primary side coil PC is split into two parts, one part of which is wound counterclockwise on the first outer column OC1 by the first primary side coil loop number w, and the other part of which is wound clockwise on the second outer column OC2 by the secondary side coil loop number x. The secondary side coil SC is also split into two parts, one part of which is wound clockwise on the first outer column OC1 by the first secondary side coil loop number y, and the other part of which is wound counterclockwise on the second outer column OC2 by the second secondary side coil loop number z, and w is not equal to x, and y is not equal to z.

Magnetomotive forces of the windings can be written as $wI_p$, $xI_p$, $yI_s$, and $zI_s$ by a primary side current $I_p$ and the secondary side current $I_s$ according to the following equation (1), respective cross voltages are represented by $V_{pw}$, $V_{px}$, $V_{sy}$, $V_{sz}$, respectively, and magnetic fluxes of the first outer column OC1, the central column CC, and the second outer column OC2 are represented by $\phi1$, $\phi2$, and $\phi3$, respectively. Magnetic resistances of the first outer column OC1 and the second outer column OC2 are represented by $R_O$, and a magnetic resistance of the central column is represented by $R_C$.

$$\phi = \frac{mmf}{R} = NI(1).$$

Where mmf is the magnetomotive force, R is the magnetic resistance, N is the number of coils, and I is the current.

Figure 6:
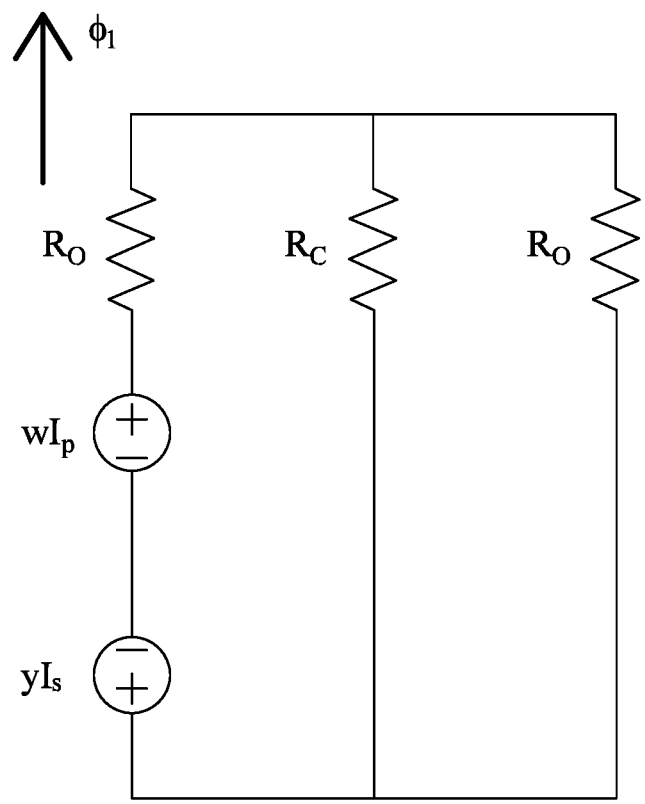
FIGS. 6 and 7 are equivalent magnetic circuit diagrams of the adjustable leakage inductance transformer according to an embodiment of the present disclosure.
Figure 7:
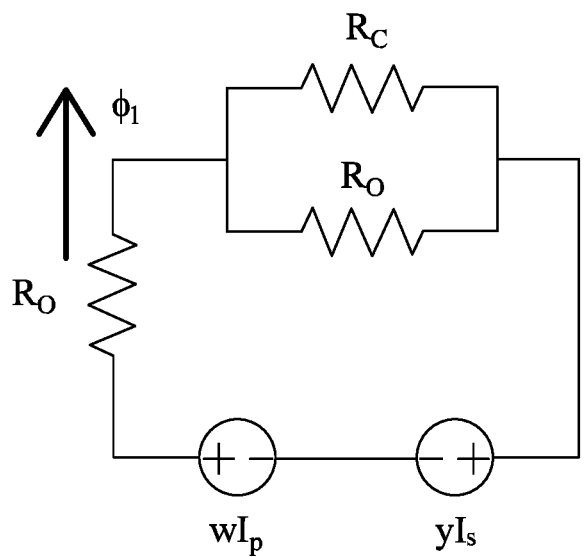

Next, reference is made to FIGS. 6 and 7, which are equivalent magnetic circuit diagrams of the adjustable leakage inductance transformer according to an embodiment of the present disclosure. Equivalent magnetic resistances that the magnetic flux generated by the first outer pillar OC1 flows through can be obtained by using the superposition theorem. For the magnetic core, since the magnetic resistances $R_O$ of the first outer column OC1 and the second outer column OC2 are the same, the equivalent magnetic resistances $R\phi1$ and $R\phi3$ through which the magnetic fluxes $\phi1$ and $\phi3$ respectively flow are the same, as shown in the following equation (2).

$$R_{\phi_1} = R_{\phi_3} = \frac{R_o(R_o + 2R_c)}{R_o + R_c}. \tag{2}$$

After the magnetic resistances through which the magnetic fluxes flow are obtained, the magnetic flux $\phi1$ is further represented by the following equation (3).

$$\phi_1 = (wI_p - yI_s) \cdot \frac{R_o + R_c}{R_o(R_o + 2R_c)}. \tag{3}$$

Although the equivalent reluctances $R_{\phi1}$ and $R_{\phi3}$ of the magnetic fluxes $\phi1$ and $\phi3$ are the same, $\phi3$ can be represented as the following equation (4) since the magnetomotive forces on the magnetic columns are different.

$$\phi_3 = (xI_p - zI_s) \cdot \frac{R_o + R_c}{R_o(R_o + 2R_c)}. \tag{4}$$

Since there is no winding on the center column CC, only the magnetic fluxes of the first outer column OC1 and the second outer column OC2 are listed.

In the above, the magnetomotive forces generated by the windings on the first outer column OC1 and the second outer column OC2 have been obtained by using the superposition theorem. Next, considering a case in that the magnetic fluxes are separate, total magnetic fluxes $\phi_{1\_total}$, $\phi_{2\_total}$, and $\phi_{3\_total}$ obtained from the first outer column OC1, the center column CC and the second outer column OC2 are represented by the following equations (5) to (7).

$$\phi_{1\_total} = \frac{wR_o + (w+x)R_c}{R_o(R_o + 2R_c)} \cdot I_p - \frac{yR_o + (y+z)R_c}{R_o(R_o + 2R_c)} \cdot I_s; \tag{5}$$

$$\phi_{2\_total} = \frac{(w-x)}{R_o(R_o + 2R_c)} \cdot I_p - \frac{(z-y)}{R_o(R_o + 2R_c)} \cdot I_s; \tag{6}$$

$$\phi_{3\_total} = \frac{xR_o + (w+x)R_c}{R_o(R_o + 2R_c)} \cdot I_p - \frac{zR_o + (y+z)R_c}{R_o(R_o + 2R_c)} \cdot I_s. \tag{7}$$

It can be obtained from FIG. 4 and FIG. 5 that a primary side cross voltage $V_{pw}$ of the adjustable leakage inductance transformer 1 is a sum of cross voltages $V_{pw}$ and $V_{px}$, and a secondary side cross voltage $V_s$ of the adjustable leakage inductance transformer 1 is a sum of cross voltages $V_{sy}$ and $V_{sz}$. A relationship between a voltage V, the number of loops n and time-varying magnetic flux $d\phi/dt$ are obtained by Faraday's law as shown in the following equation (8).

$$V = n\frac{d\phi}{dt}. \tag{8}$$

The primary side cross voltage $V_p$ and the secondary side cross voltage $V_s$ of the adjustable leakage inductance transformer 1 are expressed by equations (9) and (10).

$$V_p = \frac{(x^2+w^2)R_o+(w+x)^2 R_c}{R_o(R_o+2R_c)} \cdot \frac{dI_p}{dt} - \frac{(wy+xz)R_o+(w+x)(y+z)R_c}{R_o(R_o+2R_c)} \cdot \frac{dI_s}{dt}; \tag{9}$$

$$V_s = \frac{(wy+xz)R_o+(w+x)(y+z)R_c}{R_o(R_o+2R_c)} \cdot \frac{dI_p}{dt} - \frac{(y^2+z^2)R_o+(y+z)^2 R_c}{R_o(R_o+2R_c)} \cdot \frac{dI_s}{dt}. \tag{10}$$

Figure 8:
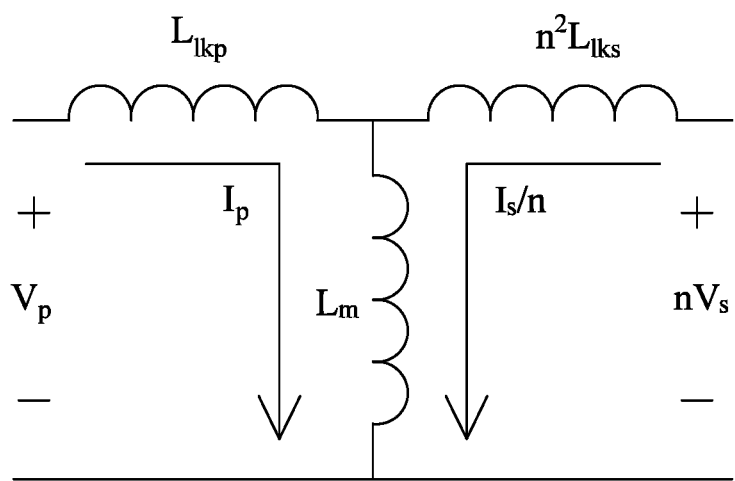
FIG. 8 is a schematic diagram of a T network of an adjustable leakage inductance transformer according to an embodiment of the present disclosure.

With the relationship between the voltage, the magnetic resistance and the number of loops of the adjustable inductive transformer 1 obtained from Faraday's law, a T network of the transformer can be utilized. In FIG. 8, a schematic diagram of the T network of an adjustable leakage inductance transformer according to an embodiment of the present disclosure is shown.

The primary side cross voltage of the transformer is $V_p$, the secondary side cross voltage of the transformer is represented by $V_s$, the primary side leakage inductance of the transformer is represented by $L_{lkp}$, the secondary side leakage inductance of the transformer is represented by $L_{lks}$, and a magnetizing inductance of the transformer is represented by $L_m$. With the T network, the secondary side crossover voltage $V_s$, the current $I_s$, and the secondary side leakage inductance $L_{lks}$ can be equivalently represented as a form of the primary side of the transformer, and the results are represented by the following equations (11) and (12).

$$V_p = (L_m + L_{lkp})\frac{dI_p}{dt} - \left(\frac{L_m}{n}\right)\frac{dI_s}{dt}; \tag{11}$$

$$V_s = -\left(\frac{L_m}{n}\right)\frac{dI_p}{dt} + \left(\frac{L_m}{n^2} + L_{lks}\right)\frac{dI_s}{dt}. \tag{12}$$

A ratio n of the primary side coil loop number to the secondary side coil loop number of the transformer is expressed by the following equation (13).

$$n = \frac{w+x}{y+z}. \tag{13}$$

Next, equations (9) and (11) and equations (10) and (12) are used for comparison, and the leakage inductance on the primary side of the transformer, the leakage inductance on the secondary side and a relationship between the magnetic circuit and the number of loops can be utilized, as shown in the following equations (14) to (16).

$$L_m + L_{lkp} = \frac{(x^2+w^2)R_o+(w+x)^2 R_c}{R_o(R_o+2R_c)}; \tag{14}$$

$$\frac{L_m}{n} = \frac{(wy+xz)R_o+(w+x)(y+z)R_c}{R_o(R_o+2R_c)}; \tag{15}$$

$$\frac{L_m}{n^2} + L_{lks} = \frac{(y^2+z^2)R_o+(y+z)^2 R_c}{R_o(R_o+2R_c)}. \tag{16}$$

Models of the exciting inductance Lm, the primary side leakage inductance $L_{lkp}$ and the secondary side leakage inductance $L_{lks}$ of the transformer can be obtained by the comparison, as shown in the following equations (17) to (19).

$$L_m = \left(\frac{x+w}{y+z}\right) \cdot \frac{(wy+xz)R_o+(w+x)(y+z)R_c}{R_o(R_o+2R_c)}; \tag{17}$$

$$L_{lkp} = \left[\frac{(xy-wz)(x-w)}{y+z}\right] \cdot \frac{R_o}{R_o(R_o+2R_c)}; \tag{18}$$

$$L_{lks} = \left[\frac{(xy-wz)(y-z)}{w+x}\right] \cdot \frac{R_o}{R_o(R_o+2R_c)}. \tag{19}$$

In other words, when the primary side cross voltage $V_p$ is applied to the primary side coil PC or the secondary side cross voltage $V_s$ is applied to the secondary side coil SC, the primary side coil has the primary side leakage inductance $L_{lkp}$, and the secondary side coil has a secondary side leakage inductance $L_{lks}$.

In the embodiment of the present disclosure, a premise of the concept of the adjustable leakage inductance is that the primary side coil PC and the secondary side coil SC must be separately wound around the first outer column OC1 and the second outer column OC2, and the coil numbers cannot be equal, that is, w must not be equal to x, and y must not be equal to z. According to the previously derived magnetic circuit model in equations (17) to (19), if the coil numbers are the same, there is not much influence on the magnetizing inductance $L_m$, but the coil numbers for the primary side leakage inductance $L_{lkp}$ and the secondary leakage inductance $L_{lks}$ will be zero, which means that if there is no difference in the coil numbers on the outer columns, no leakage flux will be generated in the central column CC to achieve the purpose of adjustable leakage inductance.

Figure 9:
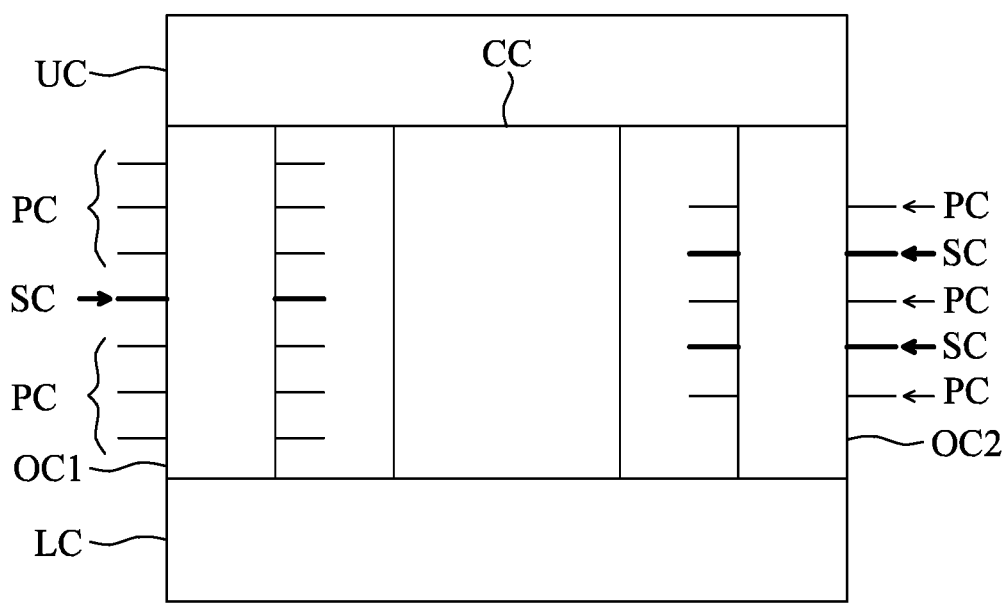
FIG. 9 is a schematic diagram showing a primary side coil and a secondary side coil of an adjustable leakage inductance transformer wound in a partially interleaved manner according to another embodiment of the present disclosure.

Furthermore, reference is made to FIG. 9, which is a schematic diagram showing a primary side coil and a secondary side coil of an adjustable leakage inductance transformer wound in a partially interleaved manner according to another embodiment of the present disclosure.

As shown in FIG. 9, thin lines represent the primary side coil PC, thick lines represent the secondary side coil SC, and the remaining square parts include the first outer column OC1, the central column CC and the second outer column OC2. Widths of the first outer column OC1 and the second outer column OC2 are 0.5 mm Next, a width of the central column CC is taken as a variable varying from 0.1 mm to 1 mm, and changes in the primary side leakage inductance and secondary side leakage inductance are observed when the width of the center column CC is changed. As shown in FIG. 9, a winding manner used in the present embodiment is that the primary side coil PC is wound clockwise on the first outer column OC1 by 6 loops, the secondary side coil SC is wound counterclockwise on the first outer column OC1 by 1 loop, the primary side coil PC is wound counterclockwise on the second outer column OC2 by 3 loops, and the secondary side coil is wound clockwise on the second outer column OC2 by 2 loops, so as to form asymmetrical windings.

Figure 10:
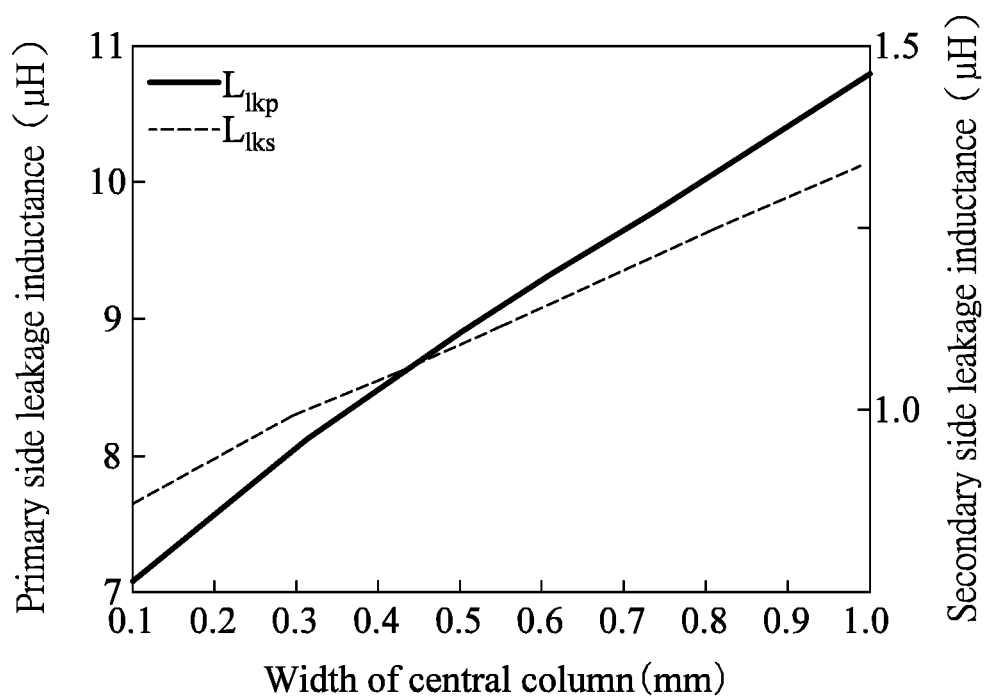
FIG. 10 is a simulation result of the adjustable leakage inductance transformer of FIG. 9.

Simulation results are presented in FIG. 10, which provides a simulation result of the adjustable leakage inductance transformer of FIG. 9. It can be found that the leakage inductances of the asymmetric windings, whether it is the primary side leakage inductance Llkp or the secondary side leakage inductance Llks, will increase significantly as the cross-sectional area of the central column CC becomes larger, in other words, the primary side leakage inductance Llkp and secondary side leakage inductance Llks are positively correlated with the cross-sectional area of the central column CC. In contrast, if the existing symmetrical winding arrangement is used, no matter how much the width of the central column CC increases, the amount of leakage inductances on the primary side and secondary side does not change.

According to the above embodiment, it is understood that the adjustable leakage inductance transformer of the present disclosure can be achieved by using a three-column type magnetic core. For the existing three-column type magnetic core, in a case where shapes of the outer columns can be used for winding, a PQ core or an RM core is generally used. However, layout design in this case will be difficult since the shapes of the outer columns, an EI core or an EE core are generally chosen for winding.

However, when a printed circuit board (PCB) uses square windings on the EI core or the EE core, it is easy to cause high current density at inner corners of traces, so that hot spots can easily accumulate at the corners. In another case where circular windings are used in the PQ core, a current density distribution is much more uniform than that of the square windings, and the magnetic core column structure 100 of the present disclosure is designed by utilizing cylindrical structures for effective cross-sectional areas of the first outer column OC1 and the second outer column OC2 of the column OC1 base on the premise.

Figure 11:
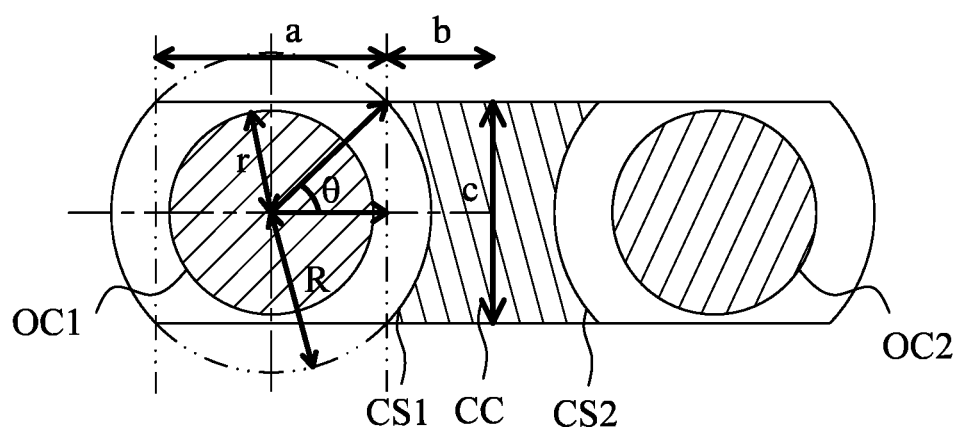
FIG. 11 is a top plan view showing a magnetic core column structure of an adjustable leakage inductance transformer according to an embodiment of the present disclosure.
Figure 12:
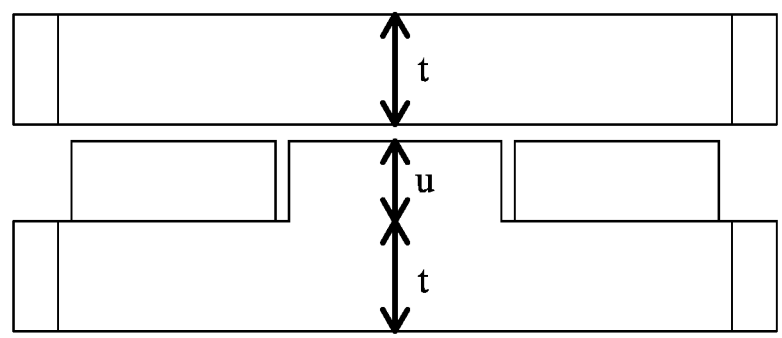
FIG. 12 is a side schematic view showing a magnetic core column structure of an adjustable leakage inductance transformer according to an embodiment of the present disclosure.

In order to achieve the goal of adjustable leakage inductance in the two outer column windings of the three-column type magnetic core, and uniform distribution for the current on the PCB windings, the magnetic core column structure 100 of the adjustable leakage inductance transformer of the present disclosure is further illustrated in FIGS. 11 and 12, which are respectively a top plan view and a side schematic view showing a magnetic core column structure of an adjustable leakage inductance transformer according to an embodiment of the present disclosure.

The adjustable leakage inductance is implemented by only winding the coils on the first outer column OC1 and the second outer column OC2, and the center column CC is not placed with any coil. The cross-sectional shape of the central column CC can be designed with consideration to the shape of the winding, thereby utilizing winding spaces of the transformer more effectively. The magnetic core column structure 100 of the present disclosure combines two separate PQ cores, uses the combined portion as the central column CC of the magnetic core, and removes one side outer column of the PQ core to achieve a novel three-column type of the magnetic core column structure 100.

Further, it is necessary to design an actual size of the magnetic core 10 while taking iron loss of the magnetic core 10, copper loss of the primary side coil PC and the secondary side coil SC, and the total volume into consideration.

First, a ratio of the leakage inductance to the magnetizing inductance and areas of the central column and the outer column will be described. According to a resonant tank design of FIG. 9, a loops ratio of the transformer is 9:3, and 6 loops of the primary side coil PC and 1 loop of the secondary side coil SC are wound counterclockwise on the first outer column OC1, and 3 loops of the primary side coil PC and 2 loops of the secondary side coil SC are wound clockwise on the second outer column OC2.

According to reference numerals of FIG. 4, w is 6, x is 3, y is 2, z is 1, and the coil numbers are substituted into the equations (17) and (18) to obtain a relationship equation of the magnetizing inductance $L_m$ and the primary side leakage inductance $L_{lkp}$ is shown in the following equation (20).

$$\frac{L_m}{L_{lkp}} = \frac{4R_o + 9R_c}{R_o}. \quad (20)$$

The magnetic resistances $R_O$ of the first outer column OC1 and the second outer column OC2 and the magnetic resistance $R_C$ of the central column CC are represented by the equations (21) and (22), where lengths of magnetic circuits the first outer column OC1 and the second outer column OC2 are 1o, a length of the magnetic circuit of the central column is 1c, an effective cross-sectional area of the first outer column OC1 and the second outer column OC2 are $A_o$, and an effective cross-sectional area of the central column CC is Ac. In the present embodiment, it is assumed that the primary side leakage inductance $L_{lkp}$ is required to be 4 μH, and the magnetizing inductance $L_m$ is required to be 20 μH, the cross-sectional area ratio of the first outer column OC1 to the central column CC can be obtained to be 9:8 by substituting the primary side leakage inductance $L_{lkp}$ and the magnetizing inductance $L_m$ into equation (26).

$$R_o = \frac{l_o}{\mu_0 \mu_r A_0}; \quad (21)$$

$$R_c = \frac{l_c}{\mu_0 \mu_r A_c}. \quad (22)$$

As shown in FIGS. 11 and 12, radius of the effective cross-sectional areas of the first outer column OC1 and the second outer column OC2 are r, a length of the effective cross-sectional area of the central column CC is c, a distance from a center point of the first outer column OC1 to a concave surface CS1 and the distance from the center point of the second outer column OC2 to the second concave surface CS2 is R, an angle between a center line from a center point of the first outer column OC1 to a center point of the central column CC and a line from the center point of the first outer column OC1 to the highest point of the effective sectional area of the central column CC is θ, where a is twice a horizontal distance from the center point of the first outer column OC1 to the highest point of the effective cross-sectional area of the central column CC, and the maximum width of the center column is b, t is a thickness of the upper cover UC and the lower cover LC, and u is a height of the central column CC.

Next, considering the overall circuit power density, an overall width of the magnetic core is set to 60 mm, and considering a value of θ of FIG. 11, if the value of θ is closer to 90, the overall length of the core becomes longer. However, the closer the value of θ is to 0°, the wider the width of the entire magnetic core becomes, so that θ can be represented by the following equation (23):

$$\theta = \sin^{-1}\left(\frac{c}{2R}\right). \tag{23}$$

θ is in a range of 30 to 60 degrees, and in the present embodiment, the magnetic core is designed by selecting the θ value of 45°. Next, the radius of the effective sectional area of the first outer column OC1 and the second outer column OC2 are defined as r, the distance R from the center point of the first outer column OC1 to the first concave surface CS1 and the center point of the second outer column OC2 to the second concave surface CS2 are defined as a width of the radius at which the magnetic core can be wound. In order to find an optimum point between core loss and copper loss, a relationship between R and r is defined as J, as shown in equation (24).

$$r(J) = \frac{R(J)}{J}. \tag{24}$$

When the value of θ in FIGS. 11 and 12 is 45°, a and c in FIG. 10 can be expressed as a form with R and a proportional parameter equation, as shown in equation (25).

$$a(J) = c(J) = \frac{2}{\sqrt{2}} \cdot R(J). \tag{25}$$

For the maximum width b, a design having a ratio 9:8 of the first outer column OC1 to the center column CC can be utilized, and a magnitude of b is expressed by the following equation (26).

$$b(J) = \frac{\frac{4}{9}\pi\left(\frac{R(J)}{J}\right)^2 + \frac{1}{4}\pi R(J)^2 - \frac{1}{2}R(J)^2}{\frac{2}{\sqrt{2}}R(J)}. \tag{26}$$

Furthermore, in order to satisfy a total width of 60 mm, the width of the radius at which the magnetic core can be wound, that is, the distances R from the center point of the first outer column OC1 to the first concave surface CS1 and the center point to the second concave surface CS2 of the second outer column OC2 may be expressed by the following equation (27).

$$R(J) = J \cdot \frac{60 \text{ mm} \cdot \sqrt{2} \, J}{(2+2\sqrt{2}) \cdot J^2 + \frac{8}{9}\pi + \frac{1}{2} \cdot \pi J^2 - J^2}. \tag{27}$$

In addition, since the cross-sectional area of the upper cover UC and the lower cover LC needs to be equal to the outer columns to ensure that there is no saturation or excessive magnetic flux density when the magnetic flux flows, the thickness t of the central column can be represented by the following equation (28).

$$t(J) = \frac{\sqrt{2}}{2} \cdot \pi \cdot \frac{R(J)}{J^2}. \tag{28}$$

Next, the effective cross-sectional areas of the outer columns and the center column CC of the magnetic core 10 are expressed by equations (29) and (30), respectively.

$$A_o(J) = \pi r(J)^2 \tag{29};$$

$$A_c(J) = 2(b(J) \cdot c(J) - \tfrac{1}{4}\pi R(J)^2 + \tfrac{1}{2}R(J)^2) \tag{30}.$$

A total volume of the magnetic core 10 can be expressed by the equation (31) by the parameters derived above.

$$V_{el}(J) = A_c(J) \cdot z + 2 \cdot A_o(J) \cdot z + 2 \cdot \text{Volume}_I \tag{31}.$$

Where z is a column height of the column, and $\text{Volume}_I$ is a volume of the upper cover UC and the lower cover LC. The copper wire winding width of the magnetic core can be expressed as shown in the equation (32).

$$\text{Copper}(J) = R(J) - r(J) \tag{32}.$$

Next, considering the core loss, a peak magnetic flux density is first expressed in a parameter equation, as shown in equation (33).

$$B_{max}(f, n_p, J) = \frac{V_{in}}{8 \cdot A_o(J) \cdot n_p \cdot f}. \tag{33}$$

Where $V_{in}$ is an input voltage of 400V, f is an operating frequency of 700 kHz, and $n_p$ is the number of loops of the primary side coil PC. In a case where a coil ratio is 3:1, the present embodiment selects 9 loops as the number of loops of the primary side coil PC of the adjustable inductor transformer 1, and selects 3 loops as the number of loops of the secondary side coil SC.

The core loss is then expressed by equation (34).

$$\text{Coreloss}(f, n_p, J) = P_v \cdot (B_{max}(f, n_p, J)) \cdot V_{el}(J) \tag{34}.$$

Where $P_v$ is unit volume loss of the magnetic core 10, and a magnitude thereof is exponentially proportional to the magnitude of the operating frequency f and the peak magnetic flux $B_{max}$, as shown in equation (35).

$$P_v = C_m \cdot f^x \cdot B_{max}^y \tag{35}$$

Where $C_m$, x, and y can be obtained from specifications provided by magnetic core manufacturers. In a case of constant frequency, only the peak magnetic flux density needs to be considered.

First, DC resistances of the primary side coil and the secondary side coil can be expressed by equations (36) and (37), respectively.

$$R_{copper\_pri}(J) = \rho \cdot \frac{Length_{pri}(J)}{h \cdot Width_{pri}(J)}; \tag{36}$$

$$R_{copper\_sec}(J) = \rho \cdot \frac{Length_{sec}(J)}{h \cdot Width_{sec}(J)}. \tag{37}$$

The total winding length of the primary side coil PC is represented by $Length_{pri}$, the total winding length of the secondary side coil SC is $Length_{sec}$, ρ is the resistivity of the copper wire, h is the thickness of the winding, and $Width_{pri}$ and $Width_{sec}$ are width of the copper wire used by the primary side coil PC and the secondary side coil SC, respectively.

Therefore, by the above description, the actual size of the magnetic core 10 can be optimized by taking the iron loss of the magnetic core 10, the copper loss of the primary side coil PC and the secondary side coil SC, and the total volume into consideration.

Figure 13:
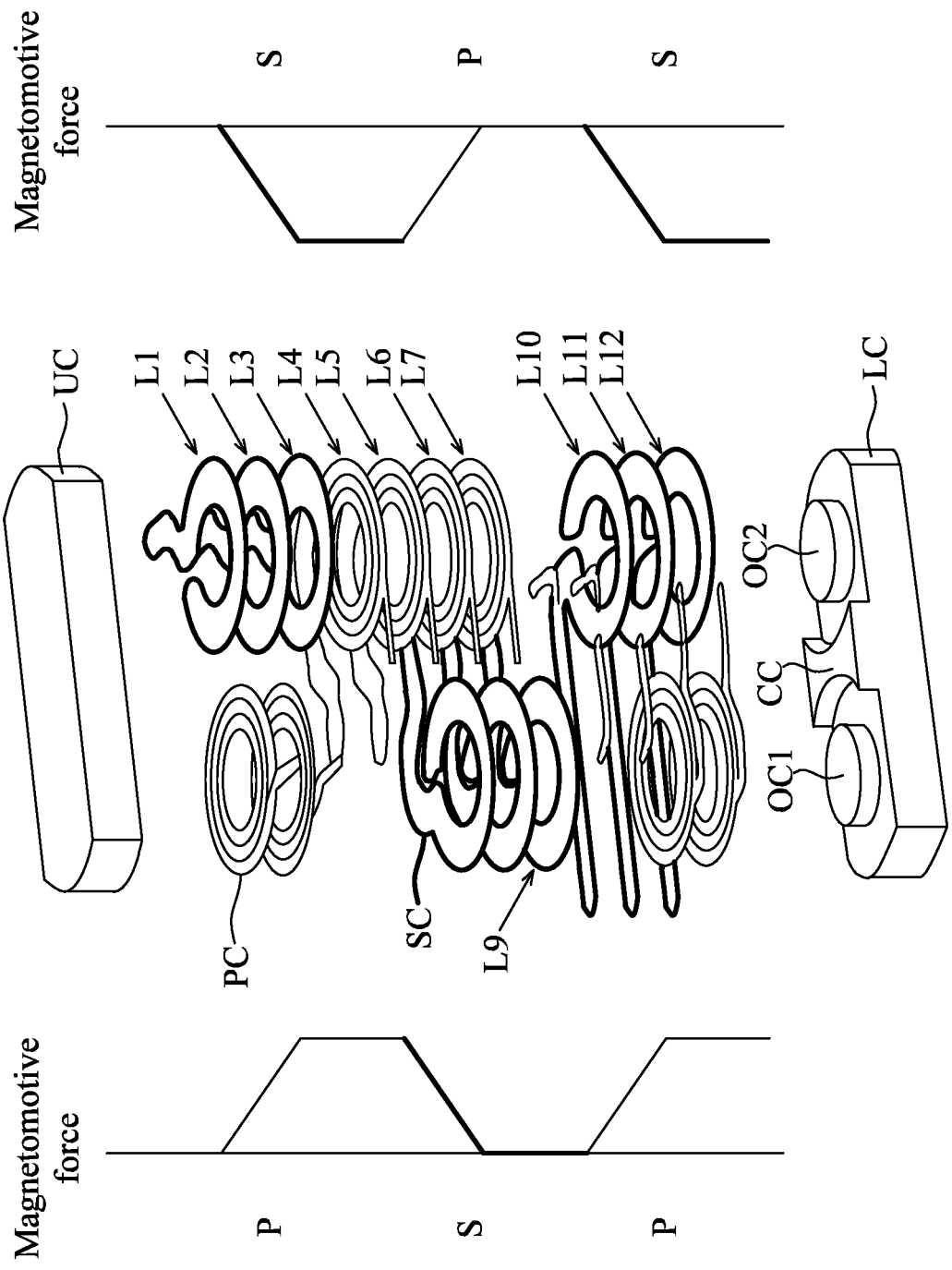
FIG. 13 is a schematic diagram showing magnetic core windings and magnetomotive force distribution of an adjustable leakage inductance transformer according to still another embodiment of the present disclosure.

Reference is made to FIG. 13, which is a schematic diagram showing magnetic core windings and magnetomotive force distribution of an adjustable leakage inductance transformer according to still another embodiment of the present disclosure. FIG. 13 shows a winding structure employed in the present disclosure, including a partially interleaved configuration. The primary side coil PC is located in a first layer L1, a second layer L2, an eleventh layer L11, and a twelfth layer L12 of the first outer column OC1, and a fourth layer L4, a fifth layer L5, the sixth layer L6, and a seventh layer L7 of the second outer column OC in parallel form, and the secondary side coil SC is located at a sixth layer L6, a seventh layer L7, a ninth layer L9 of the first outer column OC1, and a first layer L1, a second layer L2, a third layer L3, a tenth layer L10, an eleventh layer L11, and a twelfth layer L12 of the second outer column OC2 in parallel.

Next, considering an optimization of the winding thickness of the winding, this analysis must observe an influence of the AC resistance. Based on Dowell's premise, under a condition that a sine current as an excitation source is provided to a copper foil, effects of the skin effect on the AC resistance $R_{ac\_skin}$ can be expressed by equation (38).

$$R_{ac\_skin} = \frac{\xi}{2} \cdot \frac{\sinh(\xi) + \sin(\xi)}{\cosh(\xi) - \cos(\xi)} \cdot R_{dc}. \tag{38}$$

Where $\xi = h/\delta$, h is a thickness of the conductor, and $\delta$ is a skin depth of the conductor.

The effect of the proximity effect on the AC resistance $R_{ac\_proximity}$ is expressed by equation (39).

$$R_{ac\_proximity} = \frac{\xi}{2} \cdot (2m-1)^2 \cdot \frac{\sinh(\xi) - \sin(\xi)}{\cosh(\xi) + \cos(\xi)} \cdot R_{dc}. \tag{39}$$

For an application of multi-layer traces, the influence of the proximity effect is much larger than the skin effect, and the influence can be expressed by the magnitude of the magnetomotive force m corresponding to each layer. When using a fully interleaved winding manner, the minimum of the magnetomotive force can be achieved, and thus the influence of the magnetomotive force m can be minimized. However, if a non-fully interleaved winding manner is used, the AC resistance of the winding corresponding to the larger magnetomotive force can be greatly increased. A total alternating current resistance $R_{ac\_total}$ can be obtained by summing equations (38) and (39) as shown in the following equation (40).

$$R_{ac\_total} = R_{ac\_skin} + R_{ac\_proximity} \tag{40}.$$

Considering that the maximum copper thickness of the circuit board manufacturer can only be 2 oz, the thickness of the copper sheet can be obtained from the total AC resistance $R_{ac\_total}$. Under different J values, the lowest AC resistance can be obtained by selecting the copper thickness of 2 oz.

Figure 14:
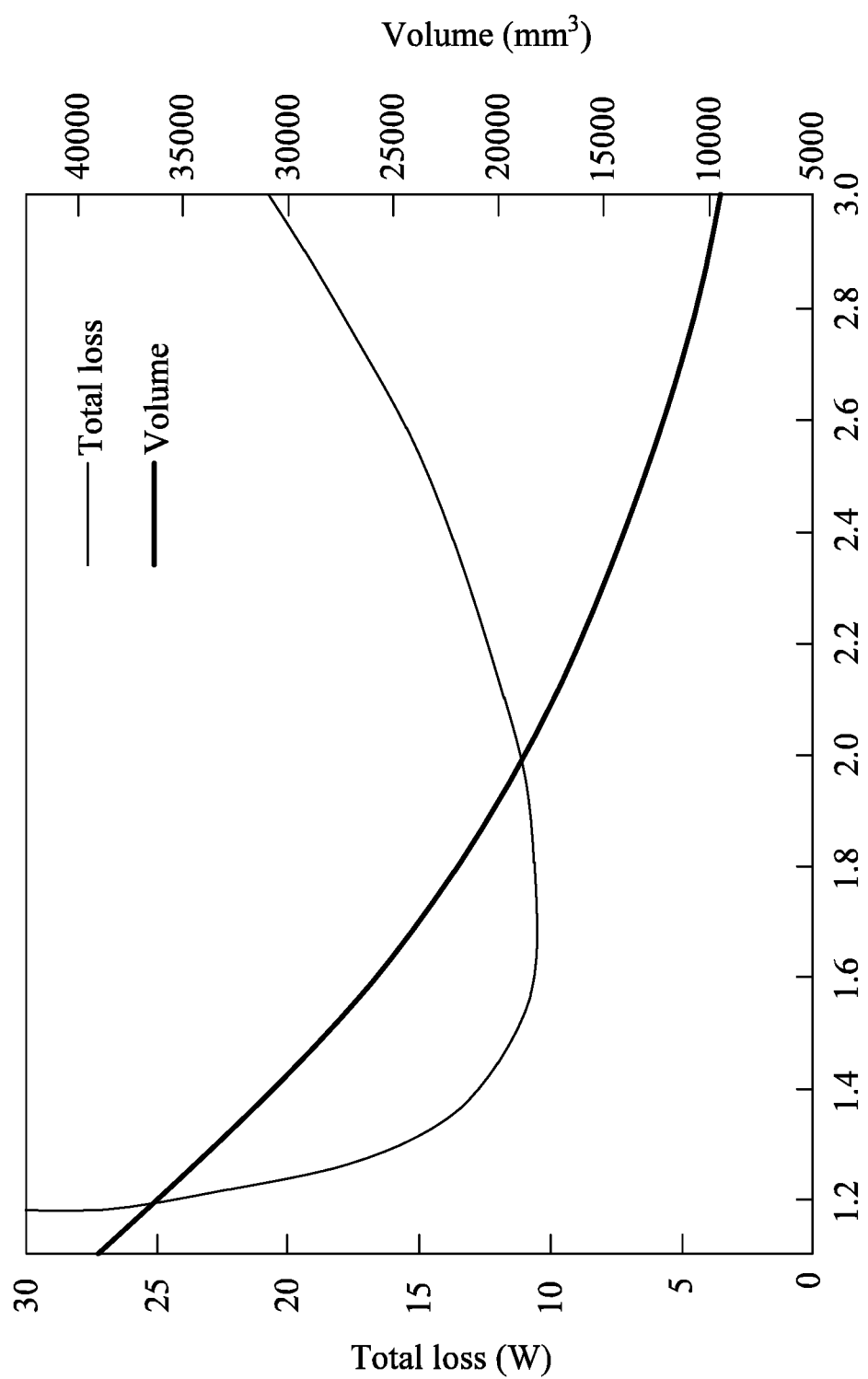
FIG. 14 is a diagram showing an iron leakage loss and a copper loss obtained with consideration to a different proportional parameter J value under a condition of full load of the adjustable leakage inductance transformer according to still another embodiment of the present disclosure.

FIG. 14 is a diagram showing an iron leakage loss and a copper loss obtained by considering a different proportional parameter J value under a condition of full load of the adjustable leakage inductance transformer according to still another embodiment of the present disclosure. As shown in equation (24) mentioned above, when J is larger, r will be smaller, thus the core loss will be increased, and the winding area radius R will become larger. Therefore, the copper loss will gradually become smaller. On the contrary, when J is smaller, the copper loss will gradually become larger. As can be found in FIG. 14, the minimum value of loss can be obtained when J is selected at 1.69. It should be noted that the total volume of the magnetic core is an important factor when considering a goal of high power density. The best point of the total loss and core volume can be found from FIG. 14 that J is 2.00. The total loss and the core volumes of these two J values are compared as shown in Table 1.

TABLE 1

| condition | J = 1.69 | J = 2 |
|---|---|---|
| $B_{max}$ | 47 mT | 51 mT |
| Core volume | 20660 mm³ | 18800 mm³ |
| Core loss | 5.34 W | 6.14 W |
| Copper loss | 5.47 W | 5.08 W |
| Total loss | 10.81 W | 11.22 W |

According to Table 1, it can be found that when J is 2, the total loss is 1.03 times that of J 1.69, but the total volume of the core is 0.9 times. Therefore, considering the above two factors, J is selected as 2 as the final design value.

Therefore, by considering the iron loss of the magnetic core 10 and the copper loss, the total volume, and the total AC resistance $R_{ac\_total}$ of the primary side coil PC and the secondary side coil SC, the thickness of the windings of the coils can be optimized.

Therefore, the adjustable leakage inductance transformer provided by the present disclosure can integrate a primary side resonant inductor, a transformer and a secondary side resonant inductor of the CLLC circuit into one magnetic element, and utilize a magnetic circuit to separate magnetic flux to increase a leakage inductance. Therefore, in addition to meeting the bidirectional resonant tank design, the improved transformer design can achieve a low loss, high efficiency integrated transformer.

Furthermore, the primary side coil and the secondary side coil are wound on the first outer column and the second outer column in an asymmetrical manner, respectively, such that a magnetic circuit of the central column can be utilized to separate the magnetic flux to further generate leakage magnetic flux. A ratio of the effective cross-sectional area of the central column to the first outer column and the second outer column can be changed to adjust the leakage inductance.

Moreover, an actual size of the magnetic core can be optimized by taking iron loss of the magnetic core, copper loss of the primary side coil and the secondary side coil, and a total volume into account. If an influence of the skin effect and the proximity effect on a total AC resistance is taken into consideration, thicknesses of windings of the primary side coil and the secondary side coil can be optimized.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An adjustable leakage inductance transformer, comprising:
   a magnetic core, including:
      an upper cover;
      a lower cover disposed opposite to the upper cover; and
      a magnetic core column structure disposed between the upper cover and the lower cover and having a central column, and a first outer column and a second outer column disposed on two sides of the central column, wherein the central column has a first concave surface facing the first outer column and a second concave surface facing the second outer column, and the first outer column and the second outer column have cylindrical structures;
   a primary side coil wound on the first outer column and the second outer column by a first primary side coil loop number and a second primary side coil loop number, respectively; and
   a secondary side coil wound on the first outer column and the second outer column by a first secondary side coil loop number and a second secondary side coil loop number, respectively;
   wherein the first primary side coil loop number is not equal to the first secondary side coil loop number, and the second primary side coil loop number is not equal to the second secondary side coil loop number,
   wherein when a primary side cross voltage is applied to the primary side coil or a secondary side cross voltage is applied to the secondary side coil, the primary side coil has a primary side leakage inductance, the secondary side coil has a secondary side leakage inductance, and the primary side leakage inductance and the secondary side leakage inductance are positively correlated with a cross-sectional area of the central column,
   wherein the magnetic resistance of the first outer column and the magnetic resistance of the second outer column are represented by Ro, and a magnetic resistance of the central column is represented by $R_C$, the first primary side coil loop number is represented by w loops, the second primary side coil loop number is represented by x loops, the first secondary side coil loop number is represented by y loops, and the second secondary side coil loop number is represented by z loops, and an excitation inductance of the adjustable leakage inductance transformer is represented by $L_m$ relationships of which are represented by the following equation:

$$L_m = \left(\frac{x+w}{y+z}\right) \cdot \frac{(wy+xz)R_o + (w+x)(y+z)R_c}{R_o(R_o+2R_c)}.$$

2. The adjustable leakage inductance transformer according to claim 1, wherein the primary side coil and the secondary side coil are alternately wound around the first outer column and the second outer column in a partially interleaved manner.

3. The adjustable leakage inductance transformer according to claim 2, wherein a first part of the primary side coil, a first part of the secondary side coil, and a second part of the primary side coil are sequentially wound on the first outer column, and a second part of the secondary side coil, a third part of the primary side coil, and a third part of the secondary side coil are sequentially wound on the second outer column.

4. The adjustable leakage inductance transformer according to claim 3, wherein a number of loops of the first part of the primary side coil and the second part of the primary side coil is the first primary side coil loop number, and a number of loops of the second part of the secondary side coil and the third part of the secondary side coil is the second secondary side coil loop number.

5. The adjustable leakage inductance transformer according to claim 1, wherein a magnetic resistance of the first outer column is equal to a magnetic resistance of the second outer column.

6. The adjustable leakage inductance transformer according to claim 5, wherein the primary side leakage inductance is $L_{lkp}$, which is represented by the following equation:

$$L_{lkp} = \left[\frac{(xy-wz)(x-w)}{y+z}\right] \cdot \frac{R_o}{R_o(R_o+2R_c)}.$$

7. The adjustable leakage inductance transformer according to claim 5, wherein the secondary side leakage inductance is $L_{lks}$, which is represented by the following equation:

$$L_{lks} = \left[\frac{(xy-wz)(y-z)}{w+x}\right] \cdot \frac{R_o}{R_o(R_o+2R_c)}.$$

8. The adjustable leakage inductance transformer according to claim 1, wherein an equivalent magnetic path length and an effective sectional area of the first outer column and the second outer column are represented by $1_O$ and $A_O$, respectively, and an equivalent magnetic path length and an effective sectional area of the central column are represented by $1_C$ and $A_C$, respectively, and magnetic resistances of the first outer column, the second outer column and the central column are represented by the following equation:

$$R_o \frac{l_o}{\mu_0 \mu_r A_o}; \text{ and}$$

$$R_c = \frac{l_c}{\mu_0 \mu_r A_c},$$

where $\mu_o$ is a vacuum permeability, and $\mu_r$ is a relative permeability of the magnetic core.

9. The adjustable leakage inductance transformer according to claim 5, wherein an effective sectional area radius of the first outer column and the second outer column is r, an effective sectional area of the central column has a length c, a distance from a center point of the first outer column to the first concave surface and a distance from a center point of the second outer column to the second concave surface are R, and an angle between a center connection line from a center point of the first outer column to a center point of the central column and a line from a center point of the first outer column to a highest point of an effective sectional area of the central column is θ, which is represented by the following equation:

$$\theta = \operatorname{Sin}^{-1}\left(\frac{c}{2R}\right) = \tan^{-1}\left(\frac{c}{2r}\right),$$

and θ is in a range of 30 degrees to 60 degrees.

\* \* \* \* \*